US010992750B2

(12) United States Patent
Hellwig et al.

(10) Patent No.: US 10,992,750 B2
(45) Date of Patent: Apr. 27, 2021

(54) SERVICE REQUEST INTERRUPT ROUTER FOR VIRTUAL INTERRUPT SERVICE PROVIDERS

(71) Applicant: Infineon Technologies AG, Neubiberg (DE)

(72) Inventors: Frank Hellwig, Wunstorf (DE); Glenn Ashley Farrall, Long Ashton (GB); Gerhard Wirrer, Hausham (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/872,216

(22) Filed: Jan. 16, 2018

(65) Prior Publication Data

US 2019/0222645 A1    Jul. 18, 2019

(51) Int. Cl.
| | | |
|---|---|---|
| *H04L 29/06* | (2006.01) | |
| *G06F 9/48* | (2006.01) | |
| *G06F 13/24* | (2006.01) | |
| *G06F 9/455* | (2018.01) | |
| *H04L 12/931* | (2013.01) | |
| *H04L 29/08* | (2006.01) | |

(52) U.S. Cl.
CPC ...... *H04L 67/1097* (2013.01); *G06F 9/45558* (2013.01); *G06F 9/48* (2013.01); *G06F 13/24* (2013.01); *H04L 49/356* (2013.01); *G06F 9/45533* (2013.01); *G06F 2009/45591* (2013.01); *G06F 2009/45595* (2013.01)

(58) Field of Classification Search
CPC ....... G06F 9/45558; G06F 2009/45591; G06F 2009/45595; G06F 13/24; H04L 49/356; H04L 67/1097; H04L 49/20; H04L 49/30
See application file for complete search history.

(56) References Cited

U.S. PATENT DOCUMENTS

| | | | | |
|---|---|---|---|---|
| 6,487,213 B1 * | 11/2002 | Chao | ................... | H04L 49/1553 370/418 |
| 2007/0157197 A1 * | 7/2007 | Neiger | ................ | G06F 9/45533 718/1 |
| 2011/0138093 A1 * | 6/2011 | Jones | ...................... | G06F 13/24 710/260 |
| 2014/0047150 A1 * | 2/2014 | Marietta | ................. | G06F 13/14 710/264 |

* cited by examiner

*Primary Examiner* — Clayton R Williams
*Assistant Examiner* — Michael Li
(74) *Attorney, Agent, or Firm* — Schiff Hardin LLP

(57) ABSTRACT

A service request interrupt router having an interrupt controller mapped to an Interrupt Service Provider (ISP) having virtual ISPs; Service Request Nodes (SRNs) configured to convert respective interrupt signals to corresponding service requests, wherein each of the SRNs is configured to direct its service request to one of the virtual ISPs; and an arbitrator configured to arbitrate among the virtual ISPs in a time-sliced manner, and for each of the virtual ISPs, to arbitrate which of the service requests directed thereto has a highest priority.

25 Claims, 6 Drawing Sheets

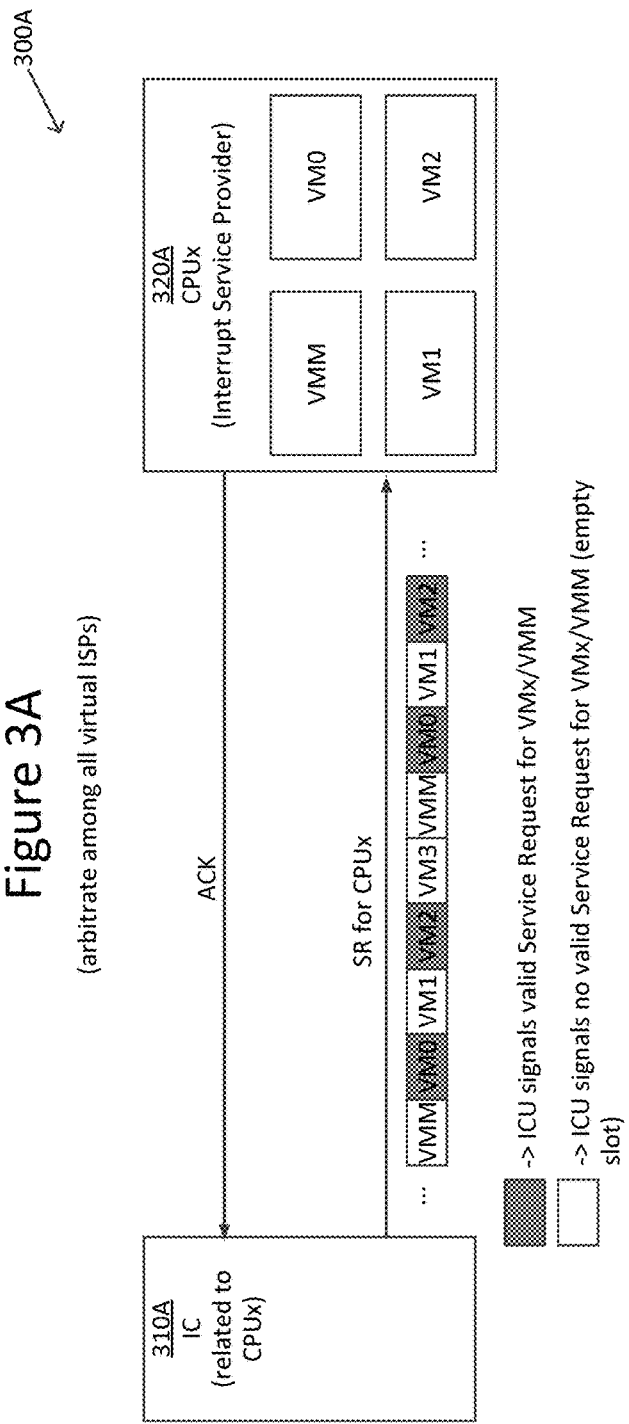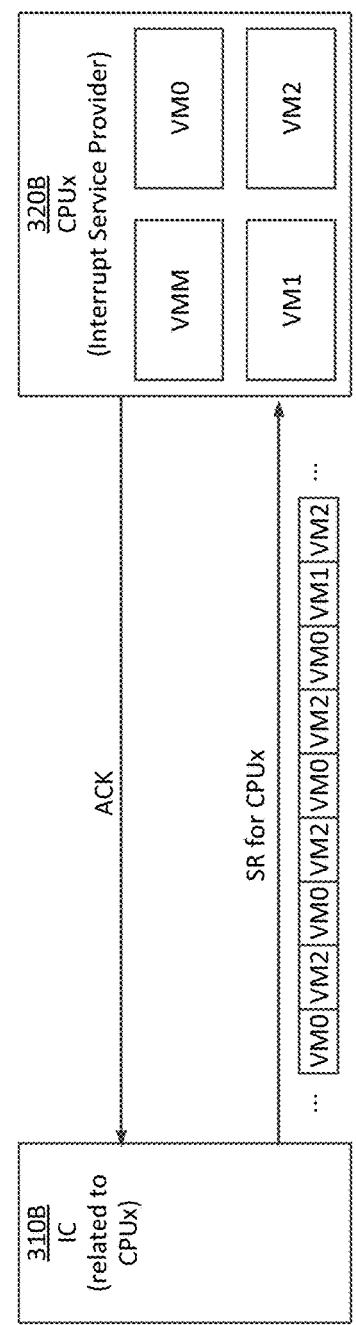

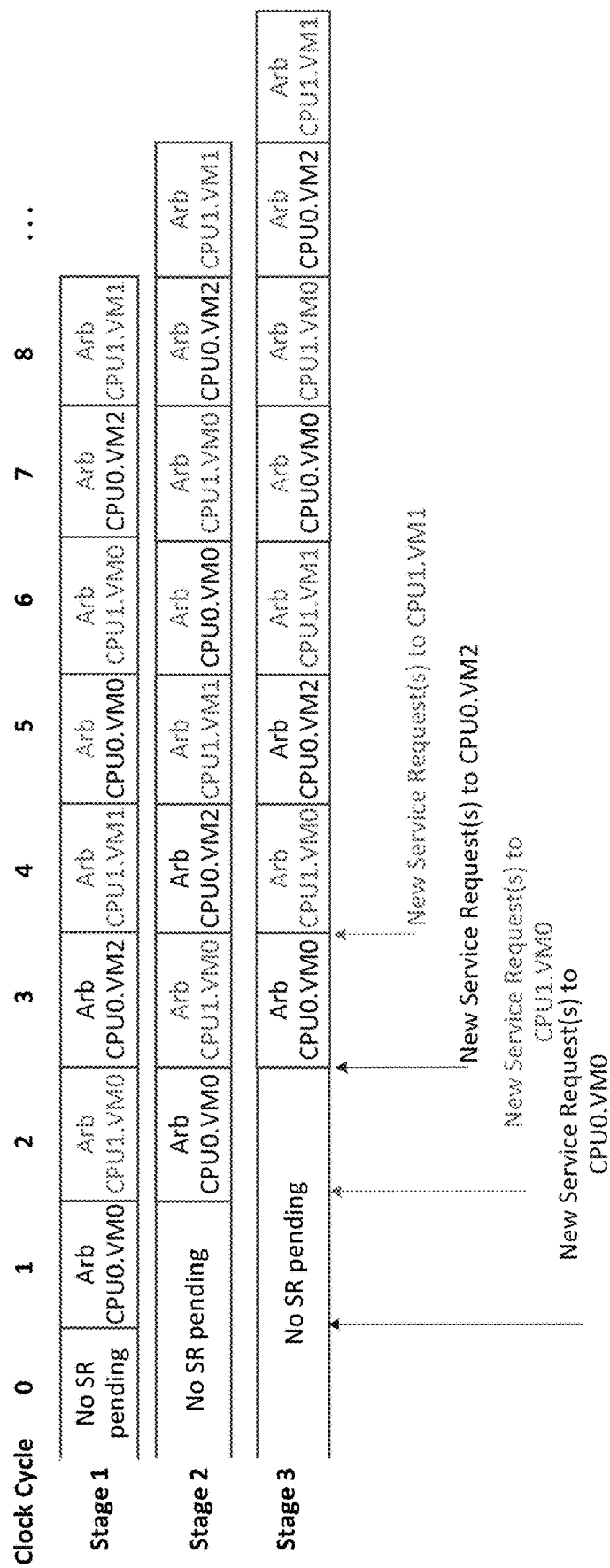

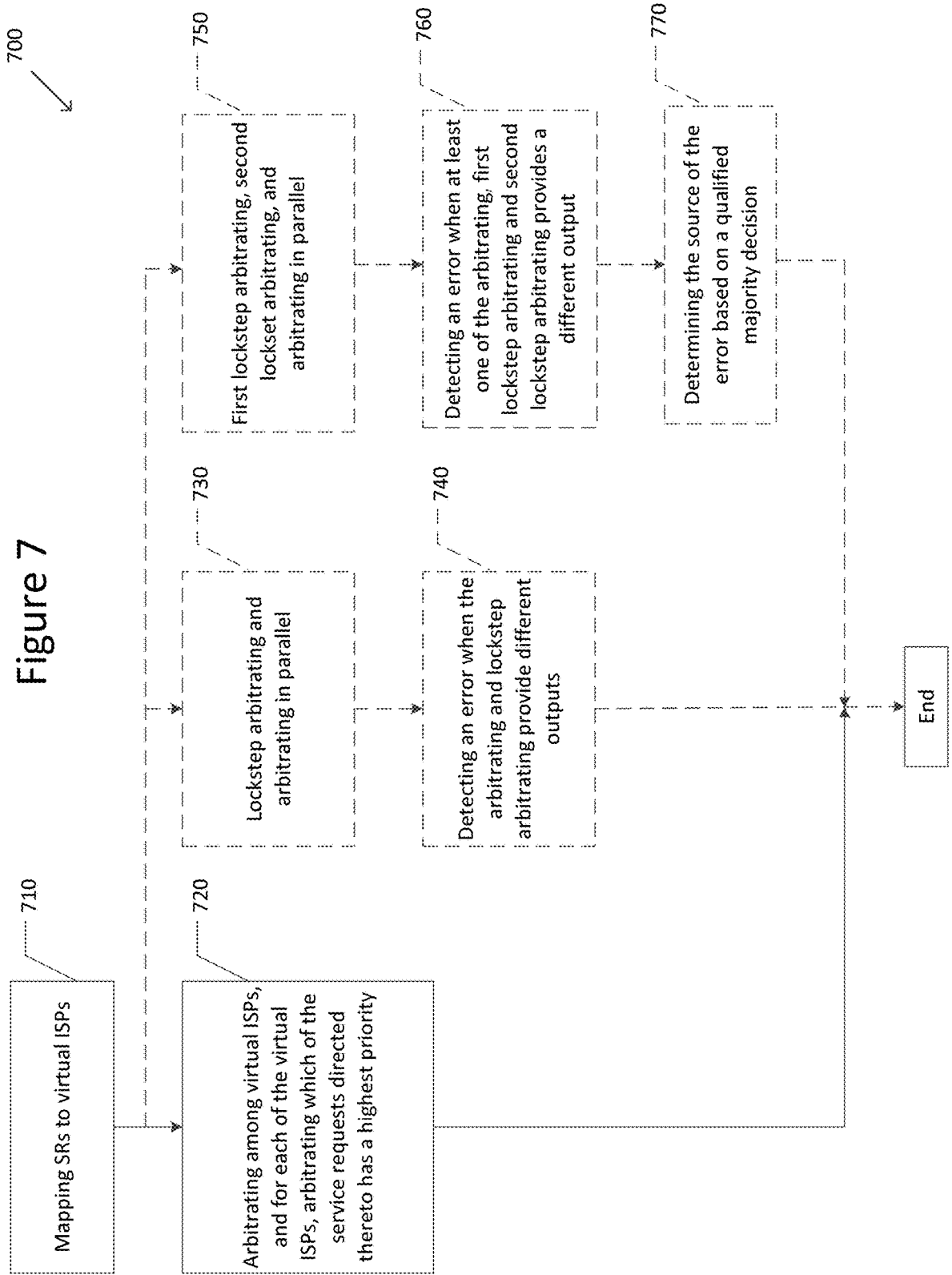

SERVICE REQUEST INTERRUPT ROUTER FOR VIRTUAL INTERRUPT SERVICE PROVIDERS

BACKGROUND

A service request Interrupt Router (IR) is an interface between on-chip resources and Interrupt Service Providers (ISPs). During operation, the on-chip resources transmit to the IR service request interrupt signals. The IR converts the interrupt signals into service requests for the ISPs by adding control information, such as priority and ISP assignment, and for each ISP, arbitrates among pending service requests mapped thereto based on assigned priorities. The ISPs then respond to the service requests. An ISP may be, for example, a Central Processing Unit (CPU) or a Direct Memory Access (DMA).

BRIEF DESCRIPTION OF THE DRAWINGS

FIGS. 3A and 3B illustrate a system having an Interrupt Controller (IC) to Central Processing Unit (CPU) interface with Service Request (SR) sequences in accordance with aspects of the disclosure.

FIG. 6 illustrates pipeline stages of an arbitration sequence 600 for an arbitrator Arb having a shared sequence with pending Service Requests (SRs) for two Central Processing Units, CPU0 (VM0 and VM2) and CPU1 (VM0 and VM1) in accordance with an aspect of the disclosure.

FIG. 7 illustrates a flowchart of a method of arbitrating service request interrupt signals in accordance with an aspect of the disclosure.

DETAILED DESCRIPTION

The present disclosure is directed to a service request Interrupt Router (IR) having an interrupt controller, Service Request Nodes (SRNs), and an arbitrator. The interrupt controller is mapped to an Interrupt Service Provider (ISP) having virtual ISPs. The SRNs are configured to convert respective interrupt signals to corresponding service requests, wherein each of the SRNs is configured to direct its service request to one of the virtual ISPs. The arbitrator is configured to arbitrate among the virtual ISPs in a time-sliced manner, and for each of the virtual ISPs, to arbitrate which of the service requests directed thereto has a highest priority. A single arbitrator thus may arbitrate for a plurality of virtual ISPs.

Figure 1:
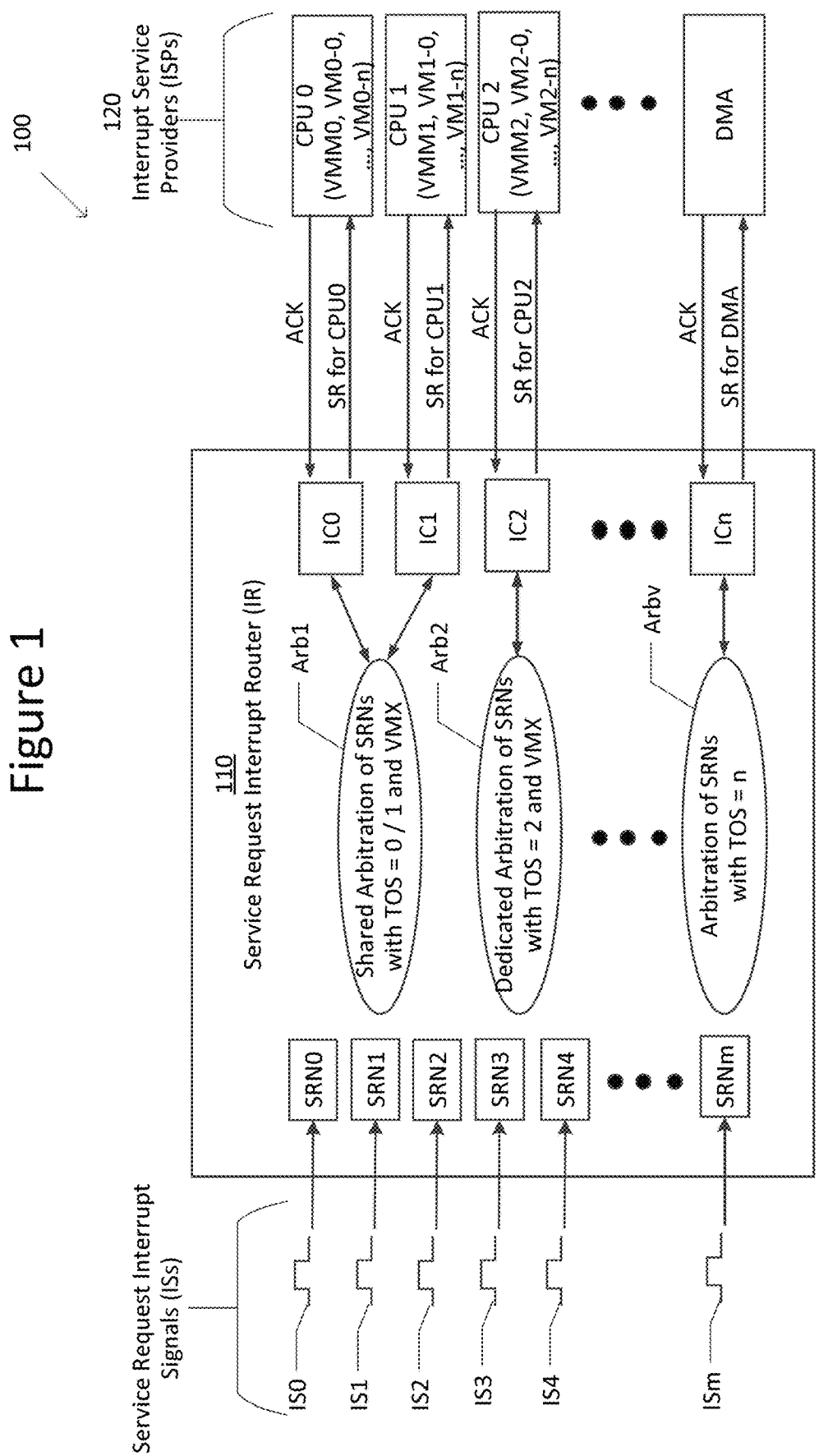
FIG. 1 illustrates a schematic diagram of an arbitration system having a service request Interrupt Router (IR) in accordance with an aspect of the disclosure.

FIG. 1 illustrates a schematic diagram of a system 100, which may be a System-on-Chip (SoC), having a service request Interrupt Router (IR) 110 in accordance with an aspect of the disclosure.

The IR 110 comprises one or more Service Request Nodes SRN0-SRNm, one or more arbitrators Arb1-Arbv, and one or more Interrupt Controllers IC0-ICn. The tasks the IR 110 may perform include, for example, assignment of priorities among Service Request Nodes SRN0-SRNm with pending service request interrupt signals, assignment of these Service Request Nodes SRN0-SRNm to the Interrupt Controllers IC0-ICn, and arbitration among Service Request Nodes SRN0-SRNm assigned to a same Interrupt Service Provider (ISP).

An Interrupt Controller (IC) is a device that combines several sources of interrupt onto one or more lines. There is one dedicated Interrupt Controller IC0-ICn mapped to each of the respective Interrupt Service Providers (ISPs), which are on-chip resources that execute service requests. An ISP may be a Central Processing Unit (CPU) or a Direct Memory Access (DMA). The CPU may have hypervisor support and execute a plurality of Virtual Machines (VM), each representing a virtual CPU having its own operating system. In addition, this CPU executes a Virtual Machine Monitor (VMM, also known as a Hypervisor) that schedules the VMs. Each VM as well as the VMM represents an independent ISP, and the IR arbitrates among all pending service requests for each of the VMs and VMM independently and in parallel. The IR needs to know the highest priority service request for each VM and the VMM for proper scheduling.

There is a Service Request Node SRN0-SRNm for each service request interrupt signal IS0-ISm. The Service Request Nodes SRN0-SRNm are configured to convert respective service request interrupt signals IS0-ISm into corresponding service requests, which are also known as interrupts. Each Service Request Node SRN0-SRNm has a service request control register and is configurable regarding, for example, Service Request Priority Number (SRPN) and Type of Service (TOS). The SRPN is defined by register bits that define the priority of the service request for the virtual ISP (i.e., VMM or VM). The TOS register bits map the Service Request Node SRN0-SRNm to a particular Interrupt Controller IC0-ICn, for example, TOS of 0 is mapped to Interrupt Controller IC0. Each of the Service Request Nodes SRN0-SRNm may be configured to direct its service request to one of the virtual ISPs (i.e., VMM or VM).

The arbitrators Arb1-Arbv are each configured to arbitrate among the hardware ISPs (CPU or DMA) and virtual ISPs (VM or VMM) in a time-sliced manner, and for each of the hardware ISP and virtual ISPs, to arbitrate which of the service requests directed thereto has a highest priority. A time-sliced manner is also known as a time-multiplexed sequence or round-robin scheme. In one aspect, an arbitrator Arb1-Arbv may be configured to arbitrate in a sequential sequence among only the ISPs and virtual ISPs having a pending service request. In another aspect, an arbitrator Arb1-Arbv may be configured to arbitrate among all of the virtual ISPs in a sequential sequence whether or not there is a pending service request.

In order to reduce the area of the service request Interrupt outer (IR) 110, it is possible to implement shared arbitrators Arb where one arbitrator is shared among a plurality of Interrupt Controllers ICs. For example, arbitrator Arb1 of FIG. 1 is shared by Interrupt Controllers IC0 and IC1 to arbitrate among the plurality of ISPs and their virtual ISPs in a time-sliced manner, and for each of the ISPs and virtual ISPs, to arbitrate which of the service requests directed thereto has a highest priority, that is, is a "winner" of the arbitration.

Alternatively, an arbitrator Arb may be dedicated to one of the Interrupt Controllers IC0-ICn. For example, arbitrator Arb2 is dedicated to Interrupt Controller IC2, and arbitrator Arbv is dedicated to Interrupt Controller ICn.

During operation, when the IR 110 receives service request interrupt signals IS0-ISm at its respective Service Request Nodes SRN0-SRNm, these Service Request Nodes SRN0-SRNm are mapped to Interrupt Controllers IC0-ICn and their associated ISPs (CPU0-CPU2 . . . DMA, VMMx, VNy) that will service the service requests. Each arbitrator Arb arbitrates among the virtual ISPs in a time-sliced manner, and for each of the virtual ISPs, arbitrates which of the Service Requests (SRs) directed thereto has a highest priority. The respective Interrupt Controller ICs informs its associated virtual ISP, via a SR signal, which of the SRs is the winner of the arbitration round. When ready, the ISP or virtual ISP responds to the Interrupt Controller IC with an acknowledgement signal (ACK), and then services the SR. The ISP's software knows to service the SR based on the SRPN and the TOS.

Figure 2:
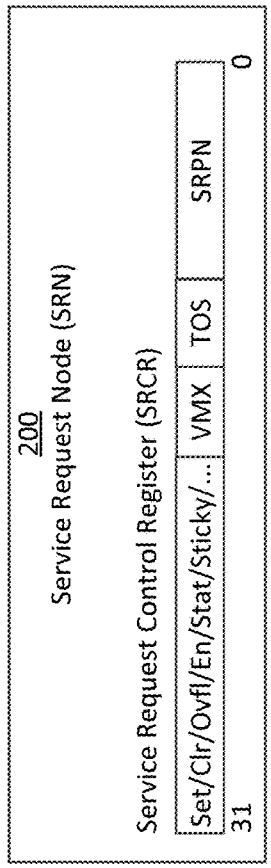
FIG. 2 illustrates a Service Request Node (SRN) with control register in accordance with an aspect of the disclosure.

FIG. 2 illustrates a Service Request Node (SRN) 200 with Service Request Control Register (SRC) in accordance with an aspect of the disclosure.

The Service Request Control Register (SRCR) is used to configure a SR's priority and hardware ISP (CPU or DMA) or virtual ISP assignment. More specifically, each SRN 200 is configurable regarding priority of the SR and the Type Of Service (TOS). The priority of the SR may include a Service Request Priority Number (SRPN). The TOS defines on which Interrupt Controller IC the Service Request Node SRN is mapped, for example, TOS0 is mapped to IC0, and TOS1 is mapped to IC1.

The example SRCR shown has 32 bits, but the disclosure is not limited in this respect. The set/clear bit is used to trigger/clear a Service Request Node SRN. The overflow bit indicates that there is a new interrupt while a SR is pending. The enable/disable bit enables/disables the Service Request Node SRN. The status bit indicates that a SR is pending (e.g., set to '1') or is not pending (e.g., set to '0'). The sticky bit indicates that the Service Request Node SRN was modified via the set/clear bit.

FIGS. 3A and 3B illustrate a system 300 having an Interrupt Controller (IC) 310 to Central Processing Unit (CPUx) 320 interface with Service Request (SR) sequence in accordance with an aspect of the disclosure. The CPU 320 comprises a Virtual Machine Manager (VMM) and the three Virtual Machines (VM0, VM1, and VM2). There are service requests pending for VM0 and VM2, and after some time shown in FIG. 3B, a new service request is pending for VM1.

FIG. 3A illustrates a sequence in which an arbitrator Arb is configured to arbitrate among all of the virtual ISPs in a fixed, sequential sequence. The arbitration sequence is therefore VMM, VM0, VM1, VM2, VMM, VM0, VM1, VM2, . . . . Even though there are service requests pending for only VM0 and VM2 initially, the arbitrator Arb still arbitrates among all of the virtual ISPs, VMM, VM0, VM1, and VM2. When there is no service request pending for a VMM or VM, the corresponding slot in the sequence is empty.

FIG. 3B illustrates a sequence in which an arbitrator Arb is configured to arbitrate among only the virtual ISPs having a pending service request. This reduces latency. The arbitration sequence is therefore VM0, VM2, VM0, VM2, VM0, VM0, VM0, VM1, VM2 . . . . In this case the arbitrator Arb arbitrates only among VM0 and VM2 initially, but then at a later time when the additional service request for VM1 is added, includes VM1. The sequence does not include the virtual ISPs with no pending service requests.

Figure 4:
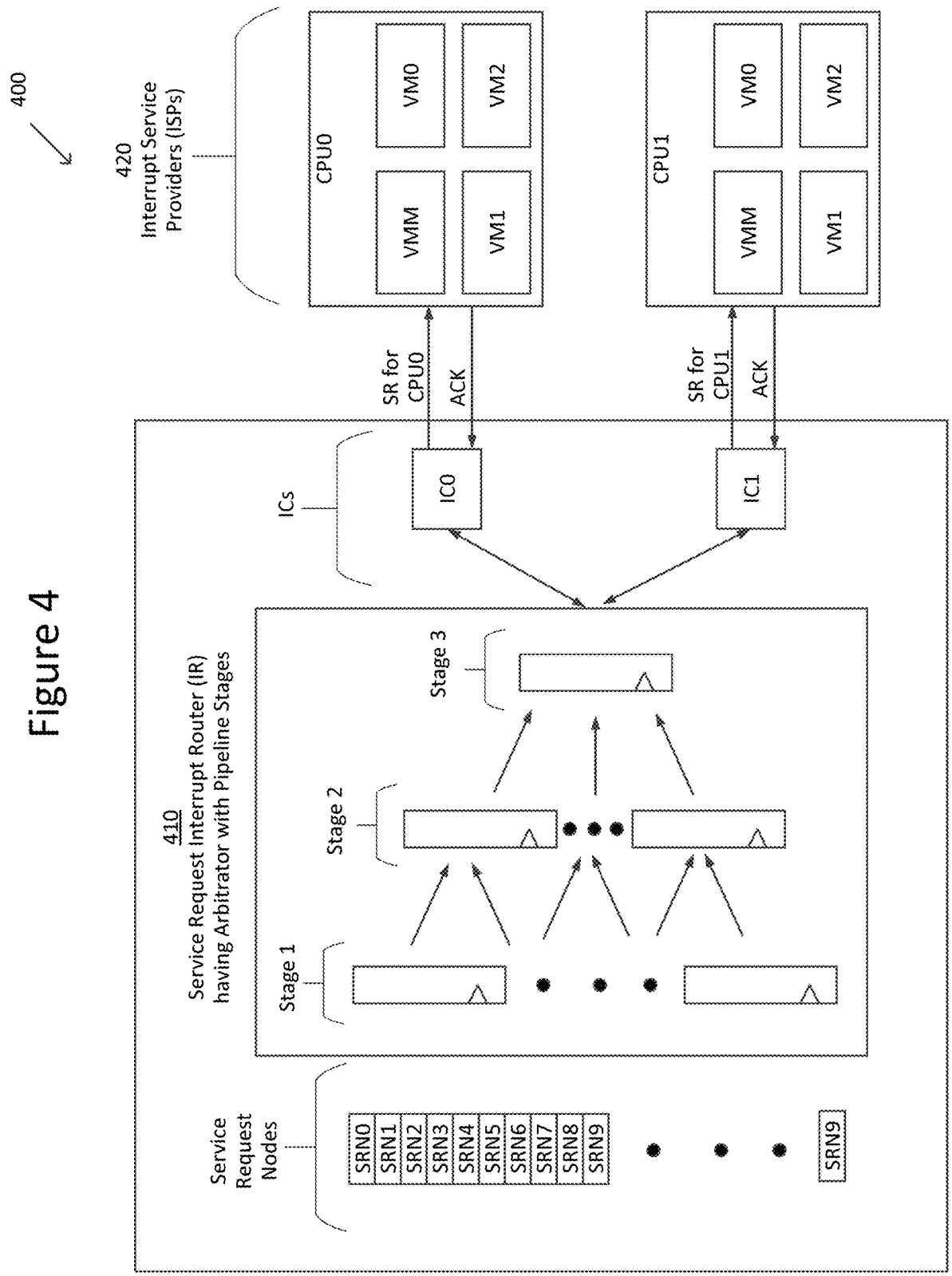
FIG. 4 illustrates a system with a service request Interrupt Router (IR) having an arbitrator including three pipeline stages to service Internet Service Providers (ISPs) in accordance with an aspect of the disclosure.

FIG. 4 illustrates a system 400 with an IR 410 having an arbitrator including three pipeline stages to service ISPs 420 in accordance with an aspect of the disclosure.

The IR 410 has an arbitrator shared between two Central Processing Units CPU0 and CPU1 and their VMMs and VMs. Each of CPU0 and CPU1 comprises VMM, VM0, VM1, and VM2.

Arbitrator Arb, which is equivalent to arbitrator Arb1 shown in FIG. 1, is implemented with pipeline stages in order to better manage a large number of Service Request Nodes SRN0-SRNm having pending SRs. A pipeline stage is equivalent to a cycle, and in this example, each arbitration round has three cycles.

The arbitrator Arb identifies which of the Service Request Nodes SRN0-SRN9 are mapped to the Interrupt Controllers IC0 and IC1, and more specifically, to the IC0's virtual ISPs (VMM, VM0, VM1, VM2), and to the IC1's virtual ISPs (VMM, VM0, VM1, VM2). The arbitrator 410 then determines for each virtual ISP which Service Request Node SRN has a highest priority, that is, is a "winner" of the arbitration round. This arbitration is not accomplished in one cycle in some systems due to physical constraints. Therefore the arbitrator 410 of this example is implemented for each virtual ISP in three pipeline stages using a time-multiplexed sequence as discussed above.

Each of the Interrupt Controllers IC0, IC1 sends a Service Request (SR) for the winning Service Request Node SRN from Stage 3 to the associated virtual Internet Service Provider ISP. The virtual ISP may take some time before it is available to acknowledge the SR. When the virtual ISP is ready, it responds to the Interrupt Controller IC0 or IC1 with an acknowledgement signal ACK. The Interrupt Controller IC0 or IC1 then clears the SR and associated Service Request Node SRN, and the SR is no longer pending. The SR and ACK identify the Service Request Node SRN using its index number and SRPN.

Although FIG. 4 shows pipelining with three stages, the disclosure is not limited in this respect. There may be any number of stages as suitable.

Figure 5:
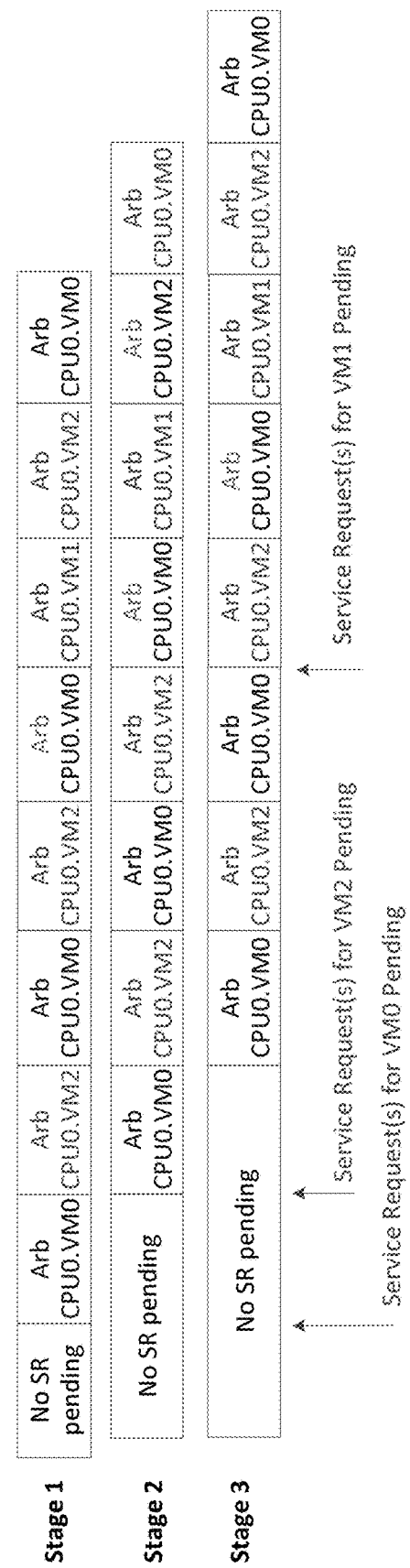
FIG. 5 illustrates pipeline stages of an arbitration sequence of an arbitrator shared by three virtual Interrupt Service Providers (vISPs) in accordance with an aspect of the disclosure.

FIG. 5 illustrates pipeline stages of an arbitration sequence 500 of an arbitrator Arb2 shared by three virtual ISPs of a same CPU2 in accordance with an aspect of the disclosure.

The pipeline has three stages or cycles, as shown in three, respective horizontal rows. The stages 1-3 are equivalent to the arbitration sequence stages illustrated in FIG. 4. Stage 1 for each cycle can be switched to a different virtual ISP (VM0, VM1, VM2). In the first cycle, the arbitrator Arb2 starts an arbitration round for VM0. In the second cycle, the arbitrator Arb2 starts the stage 1 pipeline input of a new arbitration round for VM2; meanwhile the first arbitration round for VM0 is now in Stage 2. In the third cycle, the arbitrator Arb2 determines at Stage 3 the Service Request Node SRN that is the winner of the first arbitration round. When the arbitrator Arb2 starts an arbitration round for VM2 and an arbitration round for VM0 is still pending, the arbitrator Arb2 arbitrates for the virtual ISPs in the time-multiplexed manner as discussed above. Also, when the arbitrator Arb2 starts an arbitration round for VM1 and an arbitration rounds for VM0 and VM2 are still pending, the arbitrator Arb1 arbitrates for the virtual ISPs in the time-multiplexed manner as discussed above.

FIG. 6 illustrates pipeline stages of an arbitration sequence 600 for an arbitrator Arb1 having a shared sequence with pending Service Requests (SRs) for two Central Processing Units (CPU0 and CPU1) and their virtual ISPs (CPU0.VM0, CPU0.VM2, CPU1.VM0, and CPU1.VM1) in accordance with an aspect of the disclosure.

The arbitrator Arb1 begins Stage 1 of an arbitration among the Service Request Nodes SRN having pending Service Requests (SRs) for CPU0.VM0, and this arbitration shifts through the pipeline stages as described above. Then the arbitrator Arb1 begins Stage 1 of an arbitration among the Service Request Nodes SRN having pending service request interrupt signals for CPU1.VM0, and this arbitration shifts through its three stages. Similarly, the arbitrator Arb starts Stage 1 of an arbitration among the Service Request Nodes SRN having pending service request interrupt signals for CPU0.VM2, and this arbitration also shifts through its three stages. Again, in Stage 2 there is arbitration among the Service Request Node SRN winners of Stage 1, and in Stage 3 there is arbitration among the Service Request Node SRN winners of Stage 2, and at the end of Stage 3 the Service Request Node SRN with the highest priority for the associated virtual ISP is revealed to the associated virtual ISP with the Interrupt Controller IC sending a SR. Again, the arbitration may be performed in a time-multiplexed sequence.

Priority-basis arbitration may be performed. In other words, the arbitrator Arb may provide one of its virtual ISPs priority over the others. This priority may be either dependent or independent on SRs being pending. For example, if one of the virtual ISPs having priority is a VMM, the next arbitration round started by the arbitrator Arb will be for the VMM. When this prioritized VMM is not mapped to a Service Request Node SRN having one or more pending SRs, the arbitrator Arb arbitrates for the other, non-prioritized virtual ISP, such as a VM, in a time-multiplexed sequence as described above.

Event-driven re-arbitration may be performed. The arbitrator Arb may be configured to re-arbitrate among the virtual ISPs only when an event that might result in a new winner of an arbitration round is detected. If there is a competition between the same SRs that have already been arbitrated, there is no need to re-arbitrate because you already know the winner. By not re-arbitrating unless there is such a new event, there may be significant power savings. Examples of such an event include at least one of the SRNs being re-configured, at least one of the virtual ISPs having a new SR, at least one of the virtual ISPs acknowledging a SR, or at least one of the virtual ISPs being enabled/disabled. Of course the disclosure is not limited to these examples. Re-arbitration may be triggered by any event that might result in a new winner of an arbitration round.

FIG. 7 illustrates a flowchart 700 of a method of arbitrating service request interrupt signals in accordance with an aspect of the disclosure.

First, at Step 710, Service Requests (SRs) are mapped to Interrupt Controllers IC0-ICn and more specifically, to virtual ISPs.

At Step 720, an arbitrator Arb arbitrates among virtual ISPs, and for each of the virtual ISPs, arbitrates which of the SRs directed thereto has a highest priority. As discussed above, the arbitration may be performed in a time-multiplexed sequence, either flexible or fixed.

Optionally, lockstep arbitration may be performed to monitor for errors in the arbitrator Arb. More specifically, a lockstep arbitrator (not shown) is coupled in parallel with the arbitrator Arb. At Step 730, the lockstep arbitration is performed in parallel with the arbitration in that both the lockstep arbitrator and the arbitrator Arb receive the same inputs at the same time. When the lockstep arbitrator and the arbitrator Arb do not provide the same output at the same clock cycle, at Step 740, an error is detected. This error could be within the arbitrator Arb and/or within the lockstep arbitrator. Such lockstep arbitration is generally used for an arbitrator Arb arbitrating for a virtual ISP that is considered to be safety-critical. The lockstep arbitrator is substantially a duplicate of the arbitrator Arb, and thus its separate, detailed illustration in this disclosure is not considered to be necessary. Alternatively, the lockstep arbitrator may have diversity with respect to the arbitrator in order to increase the robustness of the safety check.

Also optionally, a triple lockstep arbitration with qualified majority decision may be performed to monitor for errors in the arbitrator Arb. More specifically, each of first and second lockstep arbitrators (not shown) is coupled in parallel with the arbitrator Arb. At Step 750, each of the first and second lockstep arbitrations is performed in parallel with the arbitration in that each of the first and second lockstep arbitrators and the arbitrator Arb receives the same input at the same time. When any of the first and second lockstep arbitrators and the arbitrator Arb does not provide the same output at the same clock cycle, at Step 760, an error is detected. This error could be in any of the arbitrator Arb and the first and second lockstep arbitrators. In Step 770, the two out of the three outputs that are the same are assumed to be correct, and the arbitrator associated with the other output is assumed to have an error. Such triple lockstep arbitration is generally used for an arbitrator Arb arbitrating for a virtual ISP that is considered to be safety-critical. Each of the two lockstep arbitrators is substantially a duplicate of the arbitrator Arb, and thus for this disclosure their separate, detailed illustrations are not considered to be necessary. Alternatively, the lockstep arbitrator and the two lockstep arbitrators may have diversity with respect to each other in order to increase the robustness of the safety check.

An arbitrator shared for a CPU with a plurality of VMs and a VM, as described herein, results in reduced routing complexity, reduced chip area, and reduced power consumption.

Although specific aspects have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific aspects discussed herein.

What is claimed is:

1. A service request interrupt router, comprising:
   an interrupt controller mapped to an Interrupt Service Provider (ISP) having virtual ISPs;
   Service Request Nodes (SRNs) configured to convert respective interrupt signals to corresponding service requests, wherein each of the SRNs is configured to direct its service request to one of the virtual ISPs;
   an arbitrator configured to arbitrate among the virtual ISPs in a time-sliced manner,
   and for each of the virtual ISPs, to arbitrate which of the service requests directed thereto has a highest priority; and
   a lockstep arbitrator coupled in parallel with the arbitrator, wherein when the lockstep arbitrator and the arbitrator provide different outputs, an error in at least one of the arbitrator and the lockstep arbitrator is detected.

2. The service request interrupt router of claim 1, further comprising:
   a plurality of interrupt controllers mapped to a plurality of ISPs, respectively, wherein each of the SRNs is configured to direct its service request to one of the plurality of ISPs, and in a case of the one of the plurality of ISPs having a plurality of virtual ISPs, to one of these plurality of virtual ISPs.

3. The service request interrupt router of claim 2, further comprising:
a dedicated arbitrator assigned to each of the plurality of interrupt controllers.

4. The service request interrupt router of claim 2, further comprising:
an arbitrator configured to be shared by a plurality of interrupt controllers, and to arbitrate among the plurality of ISPs and their virtual ISPs in a time-sliced manner, and for each of the ISPs and virtual ISPs, to arbitrate which of the service requests directed thereto has a highest priority.

5. The service request interrupt router of claim 1, wherein the arbitrator is configured to arbitrate in a sequential sequence among only the ISPs and virtual ISPs having a pending service request.

6. The service request interrupt router of claim 1, wherein at least one of the virtual ISPs is a Virtual Machine Monitor (VMM) or a hypervisor.

7. The service request interrupt router of claim 1, wherein the at least one of the virtual ISPs is a Virtual Machine (VM).

8. The service request interrupt router of claim 7, wherein the arbitrator is configured to arbitrate among the virtual ISPs in a sequential sequence.

9. The service request interrupt router of claim 1, wherein the arbitrator is configured to arbitrate among all of the virtual ISPs in a sequential sequence.

10. The service request interrupt router of claim 1, wherein the arbitrator is configured to arbitrate in a sequential sequence among only the virtual ISPs having a pending service request.

11. The service request interrupt router of claim 1, wherein the ISP is a Central Processing Unit (CPU) with Virtual Machine Monitor (VMM) support.

12. The service request interrupt router of claim 1, wherein the ISP is a Direct Memory Access (DMA).

13. The service request interrupt router of claim 1, wherein the arbitrator is configured to re-arbitrate for the virtual ISPs only when an event occurs, wherein the event is selected from the group of events consisting of: at least one of the SRNs is re-configured, at least one of the virtual ISPs has a new service request, at least one of the virtual ISPs acknowledges a service request, and at least one of the virtual ISPs is enabled/disabled.

14. The service request interrupt router of claim 1, further comprising:
at least two lockstep arbitrators, each coupled in parallel with the arbitrator, wherein when at least one of the arbitrator and the lockstep arbitrators provides a different output, an error is detected based on a qualified majority decision.

15. The service request interrupt router of claim 1, wherein the arbitrator is configured to arbitrate among the virtual ISPs having pending service requests in a plurality of stages during a plurality of clock cycles.

16. The service request interrupt router of claim 1, wherein the interrupt controller is configured to signal to its mapped ISP information about a winning service request.

17. The service request interrupt router of claim 16, wherein the information about the winning service request comprises a Service Request Priority Number (SRPN) and the virtual ISP to which the winning service request is directed.

18. The service request interrupt router of claim 17, wherein the information further comprises an index number of the related SRN, or Error Detecting Code (EDC) information.

19. A system-on-chip, comprising:
the service request interrupt router of claim 1; and
the ISP having the virtual ISPs,
wherein the virtual ISPs comprise a Virtual Machine Monitor (VMM) and at least one Virtual Machine (VM).

20. The service request interrupt router of claim 1, wherein the arbitrator is configured to arbitrate for at least one of the virtual ISPs on a priority basis.

21. The service request interrupt router of claim 20, wherein the at least one virtual ISP having priority is a Virtual Machine Monitor (VMM) or a hypervisor.

22. The service request interrupt router of claim 1, wherein the arbitrator and the lockstep arbitrator receive same inputs at the same time, and when the arbitrator and the lockstep arbitrator do not provide a same output at the same clock cycle, an error is detected.

23. The service request interrupt router of claim 1, wherein the lockstep arbitrator has diversity with respect to the arbitrator.

24. The service request interrupt router of claim 1, further comprising:
a second lockstep arbitrator coupled in parallel with the lockstep arbitrator and with the arbitrator to provide triple lockstep arbitration with qualified majority decision.

25. The service request interrupt router of claim 24, wherein the arbitrator, the lockstep arbitrator, and the second lockstep arbitrator have diversity with respect to one other.

* * * * *